(12) United States Patent
Southwood

(10) Patent No.: US 6,700,657 B1
(45) Date of Patent: Mar. 2, 2004

(54) SYSTEM AND METHOD FOR DETECTING SURFACE ROUGHNESS

(75) Inventor: Mark E. Southwood, Vancouver, WA (US)

(73) Assignee: Schmitt Measurement Systems, Inc., Portland, OR (US)

(*) Notice: Subject to any disclaimer, the term of this patent is extended or adjusted under 35 U.S.C. 154(b) by 106 days.

(21) Appl. No.: 10/143,424

(22) Filed: May 10, 2002

(51) Int. Cl.[7] .................. G01J 1/04; G01B 11/30
(52) U.S. Cl. ............... 356/236; 356/600; 250/228
(58) Field of Search ................. 356/236, 600, 356/237.1, 237.2, 445–448; 250/228

(56) References Cited

U.S. PATENT DOCUMENTS

| | | | |
|---|---|---|---|
| 3,490,849 A | * 1/1970 | Hambleton ................. 356/405 |
| 4,995,727 A | * 2/1991 | Kawagoe et al. ........... 356/402 |
| 5,098,187 A | * 3/1992 | Judge ......................... 356/325 |
| 5,369,481 A | * 11/1994 | Berg et al. .................. 356/319 |
| 5,384,641 A | * 1/1995 | Imura ......................... 356/446 |
| 5,625,451 A | 4/1997 | Schiff et al. ................. 356/236 |
| 5,661,556 A | 8/1997 | Schiff et al. ................. 356/236 |
| 6,078,391 A | 6/2000 | Schiff ......................... 356/326 |
| 6,226,085 B1 | * 5/2001 | Weber ......................... 356/600 |
| 6,424,413 B1 | * 7/2002 | Weber et al. ............... 356/236 |

\* cited by examiner

*Primary Examiner*—Hoa Q. Pham
(74) *Attorney, Agent, or Firm*—John R. Thompson; Stoel Rives LLP

(57) ABSTRACT

A method for characterizing a surface are disclosed. The system includes a light source optic which direct a beam of light toward the surface. Scattered light and a spectacular beam are reflected from the surface. A collector collects the scattered light and directs the scattered light to a detector. The detector measures the intensity of the scattered light. A shutter is advanced into position to intersect the scattered light and to block a segment not having substantially any anisotropic light scatter. The shutter further passes another segment having substantially all of the anisotropic light scatter. The detector measures the intensity of the passed segment. A roughness ratio indicative of the anisotropic roughness to the isotropic roughness is produced by evaluating the total intensity of the scattered light and the intensity of the passed segment.

59 Claims, 10 Drawing Sheets

SYSTEM AND METHOD FOR DETECTING SURFACE ROUGHNESS

THE FIELD OF THE INVENTION

The present invention relates to non-contact inspection and characterization of a surface. More particularly, the present invention relates to capturing and segmenting portions of scattered light to characterize surface roughness.

THE BACKGROUND ART

The ability to accurately measure physical properties of a surface is important in a variety of applications. Such physical properties include roughness, texture, waviness, and information relating to the profile of the surface. The measure of such physical properties is generally referred to as "characterizing" a surface.

In the field of computer hardware, computer hard disks are manufactured with a known roughness, generally referred to as "texture." The texture may be implemented as circumferential scratches. Hard disks are typically textured by a process that yields the circumferential scratches through use of an oscillating rotating pad. Other than the circumferential scratches, the hard disk surface is relatively smooth. As a quality control measure, hard disk manufacturers desire a measurement device which permits them to quickly and easily measure the surface roughness as precisely as possible. Current technology trends are moving toward surface texture levels requiring surface measurement down to about the 10 Angstrom level. It would be preferable if surface roughness could be measured to within 1 Angstrom or less.

Other applications where precise roughness measurements are desirable include the computer chip wafer industry. In manufacturing chip wafers, it is desirable that the front surface of the wafer be as smooth as possible and that the back side of the wafer be finished to a known roughness.

Also, the optical industry, particularly mirror manufacturers, desires high-precision measurement devices to gauge the quality of the surfaces of their optics. Such optics are typically employed in imaging systems such as those utilized in telescopes and satellites.

Some surface characterization instruments operate by contacting the surface. A profilometer is an example of such a device. A profilometer operates by dragging a stylus across a surface. The stylus is physically connected to a recorder which traces the profile of the surface. Mathematical analysis of the profile may be conducted to determine physical properties of the surface.

For many applications, such contact-based instruments and methods are unacceptable because of the risk of contamination or other damage to the surface. Additionally, they are extremely slow and do not provide sufficient resolution to be effective for use in many applications. Thus, there exists a need for non-contact surface characterization devices and methods.

Surface inspection devices based on optics have generally proved to be effective at non-contact surface characterization. Such optical devices typically operate by directing a beam of light at the surface and measuring the amount and direction of non-specular light scattered off the surface. Through the analysis of such data, much information regarding the character of the surface can be ascertained. This information includes roughness, texture, waviness, and information relating to the profile of the surface.

One such non-contact, optical-based device is the scatterometer. To measure roughness, for example, the scatterometer measures the scatter intensity of the scattered light at every scatter angle in a selected plane. This information can then be used to generate the "power spectral density" function for that plane. The power spectral density function illustrates the distribution of the power scattered by each spatial frequency. The roughness of the surface can then be approximated by integrating the power spectral density function.

The scatter of a surface is distributed throughout an upper hemisphere above the surface receiving a beam of light. One disadvantage to the use of such scatterometers is that because the scatterometer measures only one plane of the scatter hemisphere, only a small portion of the total information about the surface is obtained. If the surface has an isotropic roughness, such methods are generally accurate. For isotropic surfaces, the total roughness is determined by performing three-dimensional integration on the power spectral density function. However, if the surface is non-isotropic, wherein anisotropic structures are present on the surface such that the surfaces have a "lay" to them or randomly rough surfaces, a scatterometer may produce grossly inaccurate results.

One method for characterizing non-isotropic surfaces is to measure the scatter intensity at every point in the scatter hemisphere. The sample data can then be manually integrated to determine the roughness. Such a method can be performed with an "out-of-plane" scatterometer. This method is extremely time consuming and is therefore not practical for most applications which require rapid inspection and analysis.

In an attempt to make scatter measurement more efficient and versatile, it has been noted that plotting the power spectral density versus the spatial frequency on a log-log plot will generally result in a straight-line curve. Thus, by obtaining two representative points on this line, the curve can be approximated. By integrating this function over selected spatial frequency limits, surface roughness can be determined.

One difficulty with this process is that the power spectral density data is two dimensional; thus, the process only works well for isotropic surfaces. Additionally, because of the limitations on the physical size of the detector, the representative points used to generate the curve are close together. Hence, any noise in the data could substantially decrease the accuracy of the fit of the curve.

Measuring additional data points to improve the fit of the curve becomes difficult because of the complexity of the necessary instrumentation. Additionally, the math to include additional data points becomes unduly complicated. Also, the inclusion of more data points still does not account for non-isotropic variations in the surface. Thus, attempting to add additional data points to improve the curve fit is not viable for many applications.

A conventional method for characterizing non-isotropic surfaces is the "total integrated scatter" method. According to this method, an optical integrating device, such as a hollow sphere, generally referred to as an "integrating sphere," is placed over the surface of the sample. The integrating sphere has an input aperture through which a beam of light may be directed into the device. A sampling aperture on the other end of the sphere permits the light to be directed onto the surface and allows light scattered off the surface to enter the sphere. An output aperture is also configured into the sphere for permitting the reflected specular beam to exit the sphere. Thus, the light scattered off the surface remains within the sphere and its intensity can be measured with a detector. This method measures most of the scattered light regardless of variations in the surface. However, some scattered light does escape from the output aperture and is therefore not measured.

An additional component which improves the collection of scattered light is the use of a second optical integrated device, such as a focusing mirror. The focusing mirror is disposed and configured to capture scattered light reflected off the surface which passes through the output aperture of the integrating sphere. The scattered light reflected by the mirror is focused to a detector which measures the intensity of this portion of scattered light. In this manner, substantially all of the scattered light is collected for measuring the total integrated scatter. Such an apparatus and method is disclosed in U.S. Pat. No. 5,625,451 to Schiff et al. which is hereby incorporated by reference.

The total integrated scatter method is useful in determining the total integrated scatter reflected from a surface and allows for a detailed analysis of the roughness of the surface. However, it would be advantageous to be able to isolate and measure the anisotropic and isotropic components of the surface roughness. Certain precision made surfaces, such as hard disks and silicon wafers, are manufactured with particular anisotropic roughness. Other surfaces have anisotropic roughness due to imperfections in the manufacturing.

A method for measuring anisotropic roughness in comparison to the isotropic roughness is disclosed in U.S. Pat. No. 6,078,391 to Schiff. The method discloses if first and second integrating devices for capturing high and low band frequency scatter reflected from a surface. The second integrating device reflects the low band scatter through a segmenting optic. The segmenting optic separates the low band scatter into different segments and isolates scatter from anisotropic roughness to one segment. The segmenting optic directs the segments to different detectors to measure the scatter intensity of a respective segment. A ratio between anisotropic roughness and isotropic roughness may then be determined.

The method for measuring anisotropic roughness requires a detector for each segment that is created by the segmenting optic. Each detector increases the size and cost of the system. Thus, it would be an advancement in the art to provide a system which requires one less detector while producing an accurate surface roughness characterization. Such methods and apparatus are disclosed and claimed herein.

BRIEF SUMMARY

A system collects scattered light and compares anisotropic and isotropic roughness of the surface. The system includes a light source capable of producing a beam of light at a predetermined wavelength which is directed to the surface to create a reflected specular beam and scattered light. The system further includes a collector for collecting the scattered light resulting from isotropic and anisotropic roughness on the surface. The collector may include a single or multiple optics such as integrating spheres, focusing mirrors, lenses, and the like.

The scattered light is directed to a detector which measures the total intensity of the received light. A shutter is then introduced to intersect the scattered light. The shutter is configured to pass a first segment of scattered light containing substantially all of the anisotropic roughness. The first segment is measured by the detector. A second segment containing substantially no anisotropic roughness is blocked by the shutter. The shutter may be embodied as a pair of opaque optics which absorb the second segment. The present invention is particularly useful where anisotropic structures are disposed in a known surface direction such as radially or circumferentially.

The total intensity contains scatter from both the isotropic and anisotropic roughness. The passed segment approximately contains all of the anisotropic roughness and one half of the isotropic roughness. Based on these measurements, a ratio of the anisotropic roughness to the isotropic roughness may then be computed.

BRIEF DESCRIPTION OF THE DRAWINGS

A more particular description of the invention briefly described above will be rendered by reference to the appended drawings. Understanding that these drawings only provide information concerning typical embodiments of the invention and are not therefore to be considered limiting of its scope, the invention will be described and explained with additional specificity and detail through the use of the accompanying drawings, in which.

DETAILED DESCRIPTION OF PREFERRED EMBODIMENTS

Figure 1:
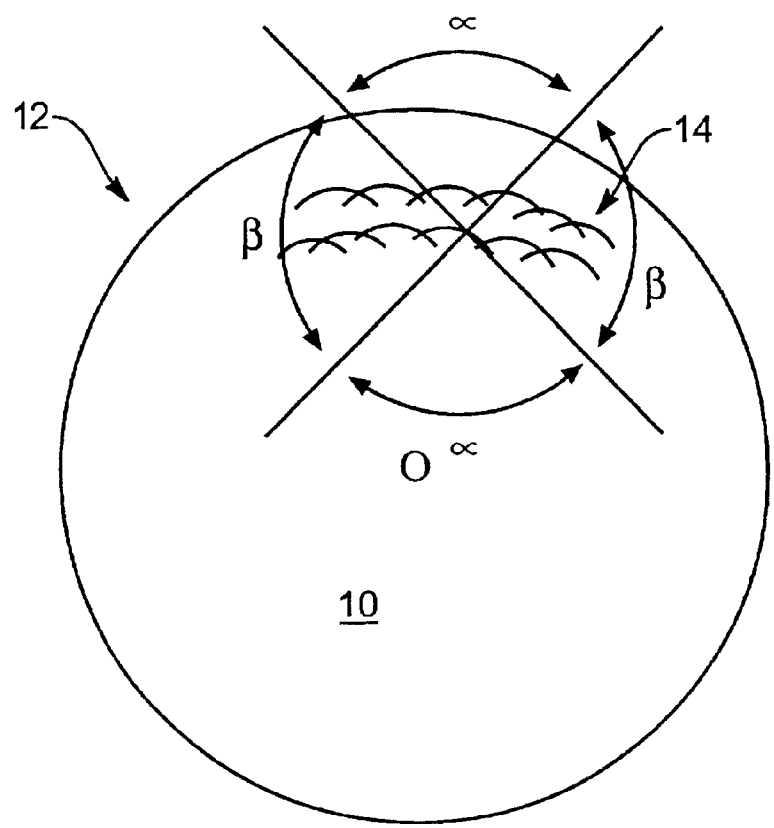
FIG. 1 is a plan view of a surface having circumferential roughness structures.

The present invention is directed to novel apparatus and methods for use in separating light scatter and measuring the segmented scatter to determine roughness components of a surface. The process of light scatter begins by directing a beam of light having a known wavelength $\lambda$ onto the surface at a known incident angle $\theta_i$ with respect to the normal of a surface. The collected scatter over the hemisphere of the surface is both a function of $\theta_s$ and $\phi$, wherein $\theta_s$ refers to a range of incident angles with respect to the normal of the surface, and $\phi$ refers to a range of circumferential angles. Spatial frequency limits are based on $\theta_i$ and $\theta_s$ with light collected being around the full $\phi$ of $2\pi$ radians. Selected spatial frequency limits establish bands of spatial frequency.

The total scatter of light or total integrated scatter corresponding to each of the selected bands of spatial frequencies is measured by collecting the scattered light over a range of scatter angles $\theta_n$ corresponding to the spatial frequency band. A conventional optical integrating device, comprising integrating spheres, lenses, mirrors, or the like, collects the total integrated scatter. Embodiments of optical integrating devices suitable for use with the invention are disclosed below. With the total integrated scatter determined for a set of spatial frequency limits, physical properties of the surface may be characterized. Such physical properties include RMS roughness, sometimes referred to as texture, waviness, representative profile, or haze.

Scatter from a surface is perpendicular to the structure on the surface producing the scatter. A segment of $\theta_s$ and $\phi$ provides roughness amplitude of the surface over a range of spatial frequencies for roughness oriented over a range of "direction" angles on the surface. The roughness amplitude provides the roughness of the "background" that exists on the entire surface which is referred to herein as the isotropic roughness. The roughness amplitude further provides the roughness of any anisotropic structures that may exist on surface and is referred to herein as the anisotropic roughness. Non-isotropic surfaces contain both isotropic and anisotropic structures which will create both isotropic and anisotropic scatter when contacted by a beam of light. Thus, the total integrated scatter will have light scatter components from the isotropic and anisotropic roughness.

The isotropic roughness scatters light uniformly as a function of $\phi$. Thus, a slice of scatter of angle $\phi$ will have the following amount of collected light for the isotropic component only:

$$P_{collected}=(\phi/2\pi)P_{isotropic},$$

where $P_{isotropic}$ is the total amount of isotropic scattered light, and $P_{collected}$ is the collected component of scattered light of $P_{isotropic}$.

Where the direction of anisotropic structures are uniform and known, the scatter of a surface may be collected and broken into two segments to isolate the anisotropic roughness into one segment. Both segments contain components of $P_{isotropic}$ and one segment contains the total component of $P_{anisotropic}$.

With reference to FIG. 1, a surface 10 of a computer disk 12, such as a hard disk, is shown. A hard disk surface 10 is used for an illustrative explanation of the invention and is a surface typically measured for roughness. The hard disk surface 10 has anisotropic structures which are embodied as circumferential scratches 14. Hard disks are typically textured by a process that yields scratches which are usually created using an oscillating rotating pad. The oscillating rotating pad produces the circumferential scratches 14 on the disk. The remainder of the surface 10 remains relatively smooth. Thus, the radial roughness includes isotropic roughness and the circumferential roughness includes isotropic and anisotropic roughness.

Although a hard disk surface 10 is represented, one of skill in the art will appreciate that the invention is applicable to numerous other surfaces as well. Thus, a surface with anisotropic, radial roughness may also be effectively measured by the present invention.

As shown in FIG. 1, the full $\phi$ of $2\pi$ radians is divided into two alpha components and two beta components. The two alpha components represent one segment and the two beta components represent a second segment. The alpha and beta angles are approximately 90 degree angles so that the segments cover two equal cross sectional areas. The alpha and beta segmentation is achieved by use of a shutter that will be discussed in greater detail below. Scatter from a surface is perpendicular to the structure on the surface producing the scatter. In the given example, there is no discharge from the circumferential scratches into the beta components, only the alpha components.

The present invention can measure the ratio between roughness amplitudes due to the circumferential, anisotropic scratches and isotropic background roughness. The alpha segment contains scattered power ($P_{alpha}$) from half of the isotropic scatter and all of circumferential anisotropic scatter. The beta segment contains scattered power ($P_{beta}$) from half of the isotropic roughness. Thus, the following equations define the segmented scatter:

$$P_{alpha}=\frac{1}{2}(P_{isotropic})+P_{anisotropic},$$

$$P_{beta}=\frac{1}{2}(P_{isotropic}),$$

$$P_{alpha}-P_{beta}=P_{anisotropic},$$

$$P_{alpha}+P_{beta}=P_{total},$$

where $P_{anisotropic}$ represents all the scattered power from the circumferential roughness. In this manner, the anisotropic and isotropic scatters may be separated and measured from the total scatter.

A parameter (L) is defined herein as a contrast ratio between roughness amplitude in the alpha and beta segments. The ratio L allows for a comparison indicative of the circumferential anisotropic roughness to the isotropic roughness. The ratio L is a further comparison of scatter found looking radially (R) and circumferentially (C). Thus, the following relationship exists for the ratio L:

$$L=R/C=P_{alpha}/P_{beta}.$$

Figure 2:
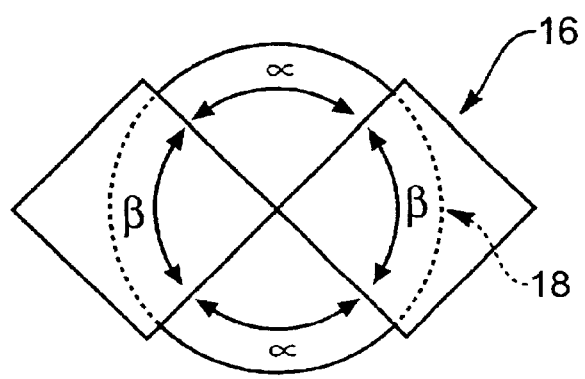
FIG. 2 is a plan view of one embodiment for a shutter used to block a segment of light scattered from a surface.

With reference to FIG. 2, a shutter 16 is shown which blocks light scatter from the beta segments. In one embodiment, the shutter 16 includes a set of opaque optics and is anticipated for use with a scatter beam 18 having a circular cross section. The opaque optics are designed to absorb light and effectively eliminate passage of light. In operation, the scatter beam 18 is directed to the shutter 16 where the shutter 16 intersects the scatter beam 18. The alpha segment passes by the shutter 16 to a detector, whereas the beta segment is blocked.

Where the anisotropic structure on the surface is uniformly radial, the shutter may be altered to pass the beta segment and block the alpha segment. With such an anisotropic structure, the anisotropic scatter will be in the beta segments. It follows then that the equations from above will be for a radial anisotropic structure:

$$P_{beta}=\frac{1}{2}(P_{isotropic})+P_{anisotopic},$$

$$P_{alpha}=\frac{1}{2}(P_{isotropic}),$$

$$P_{beta}-P_{alpha}=P_{anisotropic},$$

$$P_{alpha}+P_{beta}=P_{total},$$

$$L=C/R=P_{beta}/P_{alpha}.$$

In this manner, a ratio roughness for both circumferential and radial anisotropic structures may be determined by dividing the scatter off a surface into two segments.

The shutter 16 receives at least a portion of scattered light from the surface. The scattered light is collected from the surface by a device generically referred to as a collector. One of skill in the art will appreciate that such a collector may take any number of embodiments as long as it uniformly gathers both isotropic and anisotropic scatter from the surface. The collector then focuses or directs at least a portion of the scattered light to the shutter 16.

Figure 3:
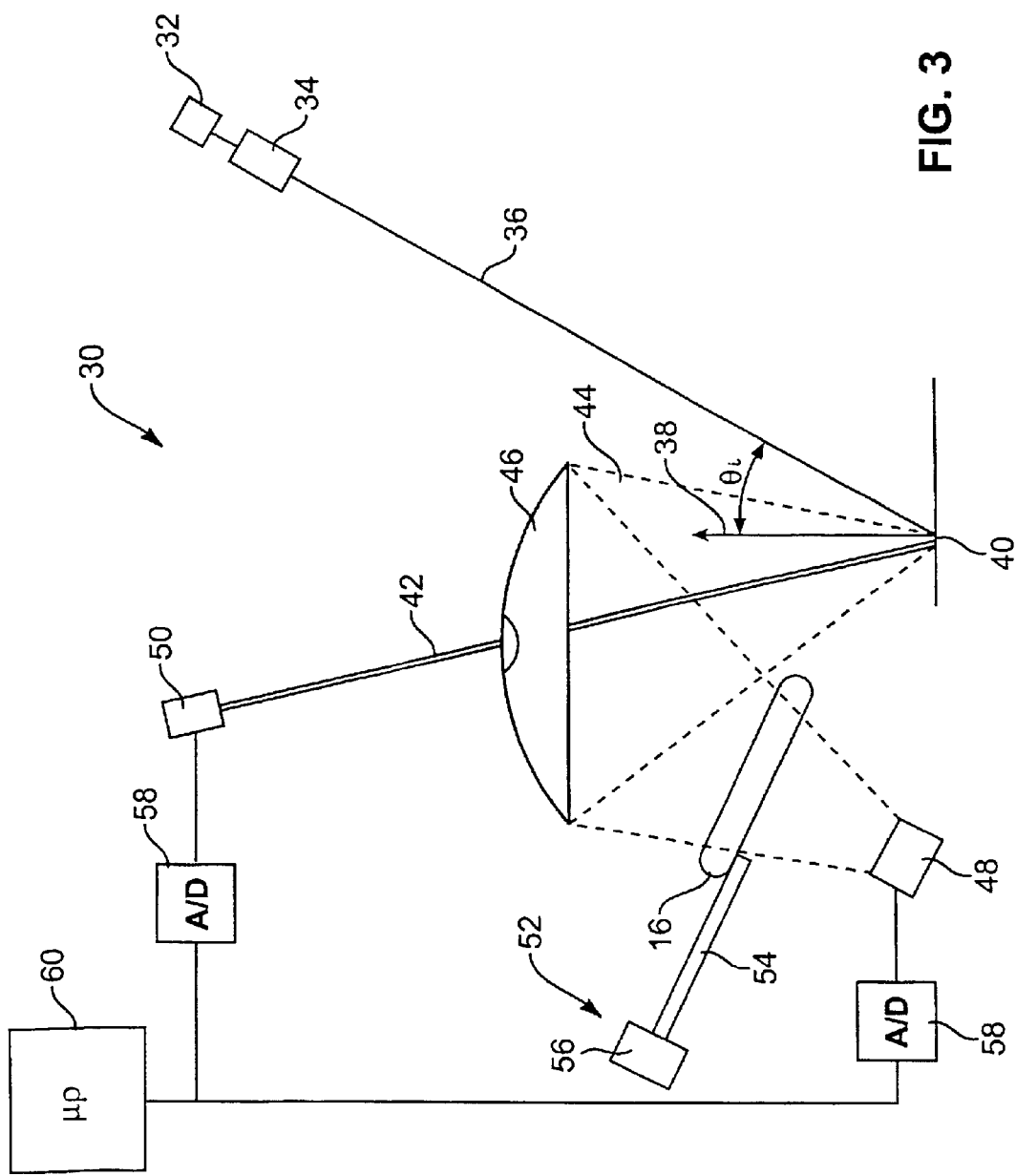
FIG. 3 is a schematic diagram of one embodiment of an apparatus of the present invention with an integrated optical device.

With reference to FIG. 3, one embodiment of a system 30 of the present invention is shown. The system 30 includes a light source 32 capable of producing a cone or beam of light at a predetermined wavelength. For purposes of this description, the term cone or beam may be used interchangeably and does not necessarily indicate the shape of the light. Positioned adjacent the light source 32 is a focusing optic 34 for directing a beam of light 36 toward the surface at an incident angle a with respect to the normal 38 of the surface 40. In this embodiment, the light source 32 and focusing optic 34 produce an incident beam having a circular cross section. The focusing optic 34 may include any of the conventional optical configurations known to one of skill in the art.

When the beam of light 36 impacts the surface 40, a specular beam 42 and scattered light 44 are reflected off the surface 40. In this embodiment, the system 30 includes a collector 46 which is positioned and configured to receive the scattered light 44 while permitting the specular beam 42 to pass through. The collector 46 may be an integrating sphere, a mirror, a lens, or any other optical integrating device modified in accordance with the teachings of the present invention. In the embodiment shown, the collector 46 includes a focusing mirror.

The collector 46 directs the scattered light 44 to a first detector 48. The system 30 further includes a specular detector 50 that is positioned to receive and detect the intensity of the specular beam 42 after it passes through the collector 46. The specular detector 50 may be positioned such that its field of view encompasses all of the specular beam 42. The specular detector 50 may be a low scatter detector to prevent it from being a source of stray light. The detectors 48, 50 may include any detector known for such a use, including commercially available silicon photo diodes.

The system 30 further includes a shutter 16 that may be coupled to an advancing apparatus 52. The advancing apparatus 52 serves to advance the shutter 16 into the path of scattered light and to retract the shutter 16. Thus, the shutter 16 moves between an advanced position wherein the shutter receives scattered light 44 and a retracted position wherein the shutter does not substantially intersect the scattered light 44. The advancing apparatus 52 may be embodied in any number of ways and including levers, servo motors, actuators, and the like. In one embodiment, the advancing apparatus 52 includes an arm 54 that couples to the shutter 16. The arm 54 in turn couples to a servo motor 56.

In operation, the first detector 48 measures the total light scatter, given as $P_{total}$, without the shutter 16 in place. The shutter 16 is then advanced to intersect the light scatter as shown in FIG. 2. Where circumferential, anisotropic roughness exists, the shutter 16 passes the alpha segment and blocks the beta segment. The light scatter of the alpha segment is given by, $P_{alpha}=\frac{1}{2}(P_{isotropic})+P_{anisotropic}$. After taking two measurements, the light scatter for the beta segment may be calculated as $P_{total}-P_{alpha}=P_{beta}$. The ratio L may be calculated as, $L=(P_{total}-P_{alpha})/P_{alpha}$.

Similarly, where radial, anisotropic roughness exists, the shutter 16 passes the beta segment and blocks the alpha segment. The light scatter for the alpha segment may be calculated as $P_{total}-P_{beta}=P_{alpha}$. The ratio L may be calculated as, $L=(P_{total}-P_{beta})/P_{beta}$. In this manner, the present invention eliminates the need for a detector for each segment.

A principal source of secondary stray light is the hardware and mounting apparatus associated with all portions of the system 30. The generation of such secondary stray light can be substantially eliminated by ensuring that the exterior surfaces of hardware components are made out of, or coated with, a material which is light absorbing at the wavelength of the beam 36.

The signals from the detectors 48, 50 are processed in accordance with standard signal processing techniques well known in the art. The detectors 48, 50 may be in electrical communication with analog-to-digital converters 58 before being processed by a microprocessor 60. One of skill in the art will readily appreciate that various methods are available to process received signals to produce output data in a variety of useful forms.

Figure 4:
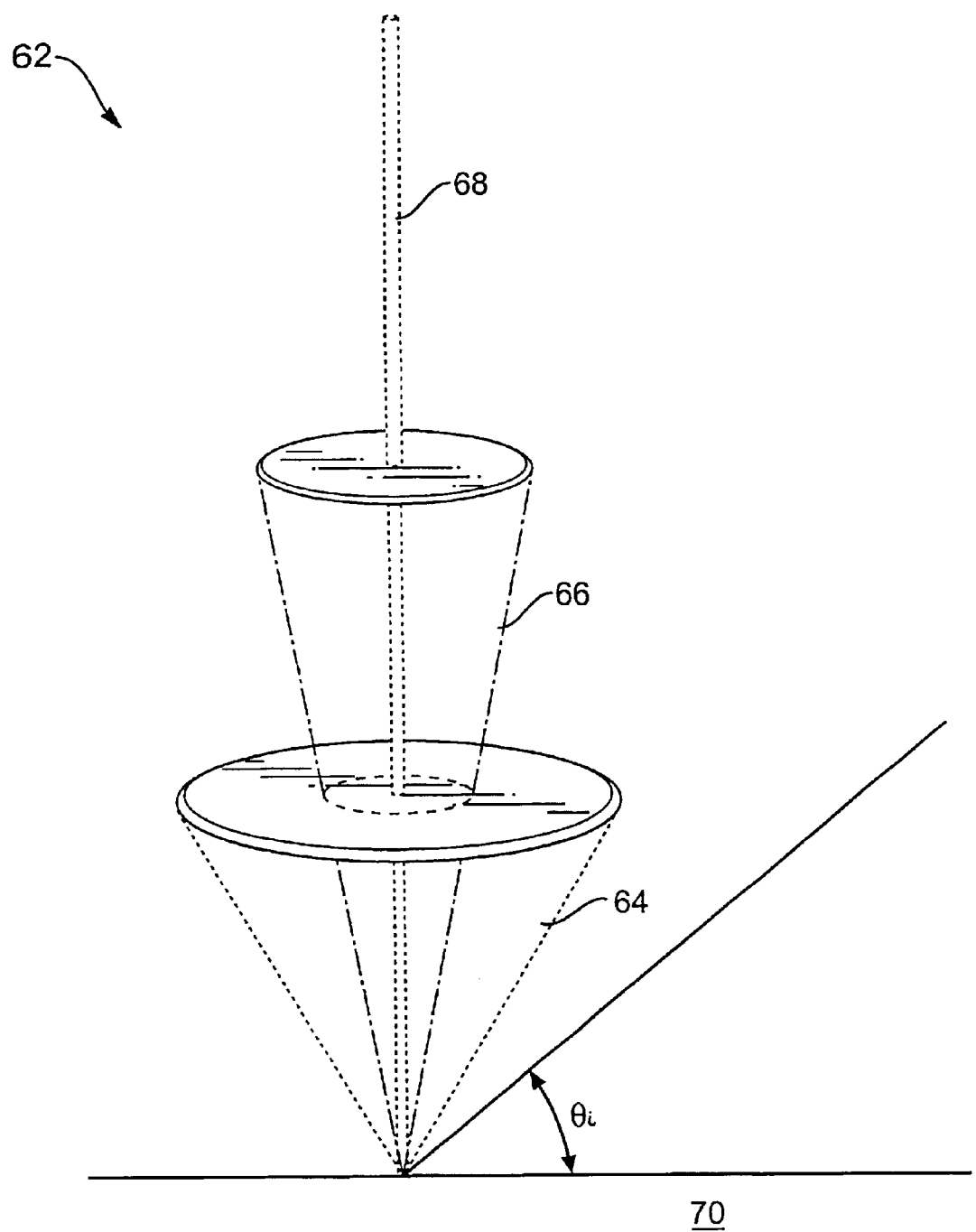
FIG. 4 is a perspective view of various components of light scatter.

Referring to FIG. 4, a perspective view illustrating the various components of scattered light 62 is shown. Dividing and separately measuring the scattered light into high and low frequency bands 64, 66 and a specular beam 68 provides a more accurate characterization of a surface 70. As such, a separate detector is used to measure the high and low frequency bands 64, 66, and the specular beam 68.

Figure 5:
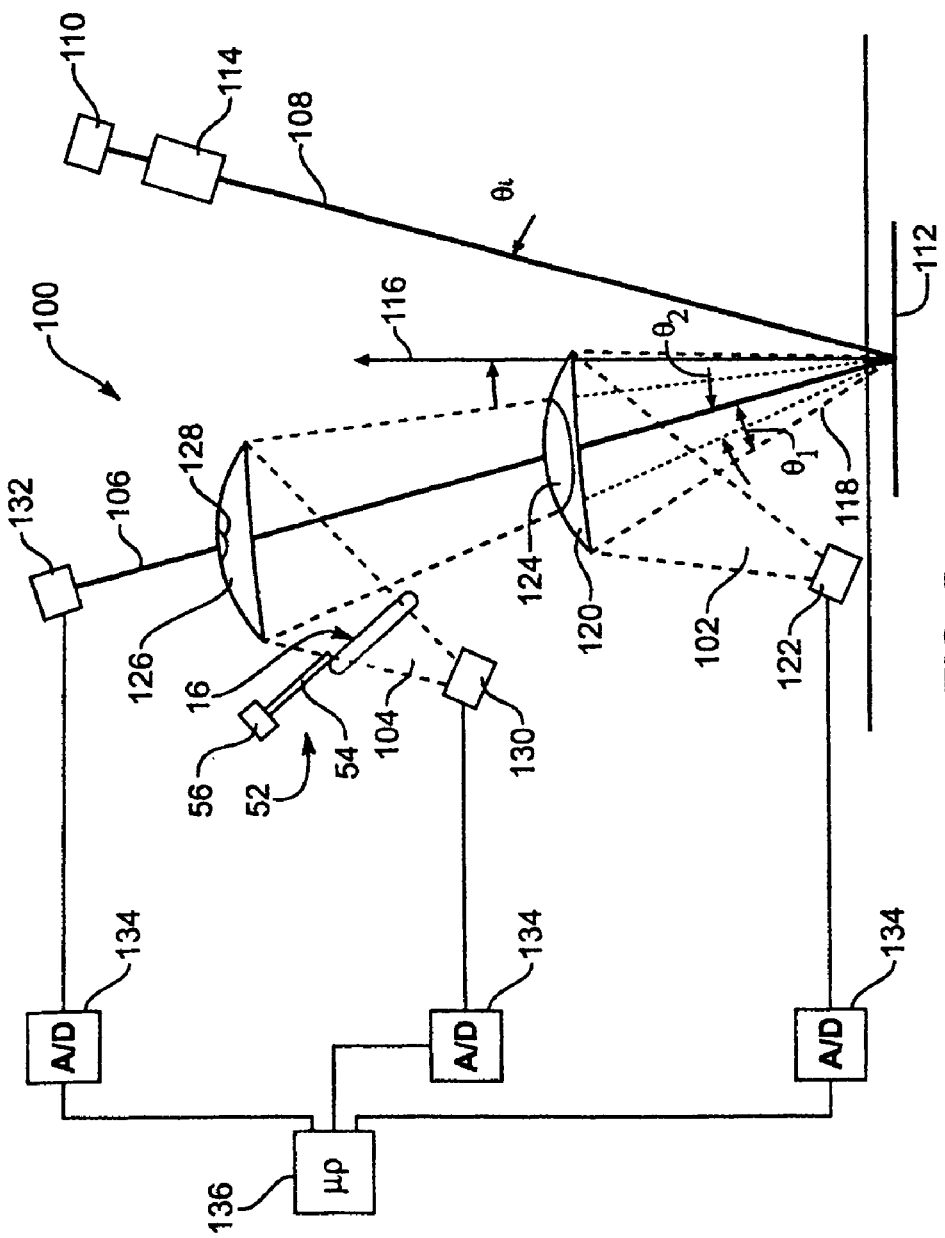
FIG. 5 is a schematic diagram of an alternative embodiment of an apparatus of the present.

Referring to FIG. 5, an alternative embodiment of a system 100 is shown which separates scattered light into high band 102, low band 104, and specular beam 106 components. One of skill in the art will appreciate that the beam of light 108 may be separated into additional components. Thus, the high and low bands 102, 104 may be separated into additional bands. The embodiments shown herein provide an efficient and accurate system for surface characterization but are not inclusive of scope of the present invention.

As in the embodiment of FIG. 3, the system 100 includes a light source 110 for producing a beam of light 108 of a known wavelength onto a surface 112. A focusing optic 114 directs the beam 108 to the surface 112 at an incident angle $\theta_1$ with respect to the normal 116 of the surface 112. When the beam 108 impacts the surface 112, a specular beam 106 and scattered light 118 are reflected off the surface 112.

The system 100 includes a high band collector 120 which is positioned to reflect the high band 102 of the scattered light 118 while permitting the low band 104 and the specular beam 106 to pass through. The high band collector 120 is shown as a focusing mirror but may also be embodied as an integrating sphere, mirror, lens, or other optic. The high band collector 120 is configured such that it captures the high band portion 102 of light scatter extending from a first scatter angle $\theta_1$ to a second scatter angle $\theta_2$. The high band collector 120 directs the high band portion 102 to a high band detector 122.

The high band collector 120 includes an output aperture 124 having a certain radius. The output aperture 124 is sized to pass the low band portion 104 of the scattered light contained within the scatter angle $\theta_2$. As illustrated in FIG. 5, the scatter angles are measured with respect to the specular beam 106.

The system 100 further includes a low band collector 126 which is positioned and configured to receive the low band portion 104 of the scattered light as it exits the output aperture 124. Like the high band collector 120, the low band collector 126 may include an integrating sphere, a mirror, a lens, or other optic device. In the embodiment shown, the low band optic 126 includes a focusing mirror configured with an output aperture 128 through which the specular beam 106 passes. The low band collector 126 directs the low band portion 104 to a low band detector 130.

The system 100 further includes a shutter 16 disposed to receive the low band portion 104. As in the embodiment of FIG. 3, the shutter 16 is coupled to an advancing apparatus 52 that advances and retracts the shutter 16 as needed. The shutter 16 may be configured to block the beta or alpha segments depending on whether the anisotropic roughness is circumferential or radial. The shutter 16 is disposed to intersect the low band 104 because the low band 104 primarily contains the anisotropic roughness.

Operation of the system 100 is similar to that provided in the embodiment of FIG. 3. A measurement is taken without the shutter 16 in place so that the low band detector 130 receives the full low band portion. The shutter 16 is then advanced and a measurement is taken so that the low band detector receives the alpha or beta segment. A simple calculation as given above produces a roughness ratio between anisotropic and isotropic roughness.

The system 100 further includes a specular detector 132 to receive the specular beam 106. Components of the system 100 may also be coated with a material to absorb stray light. The detectors 122, 130, 132 may be coupled to analog-to-digital converters 134 before being processed by a microprocessor 136.

Figure 6:
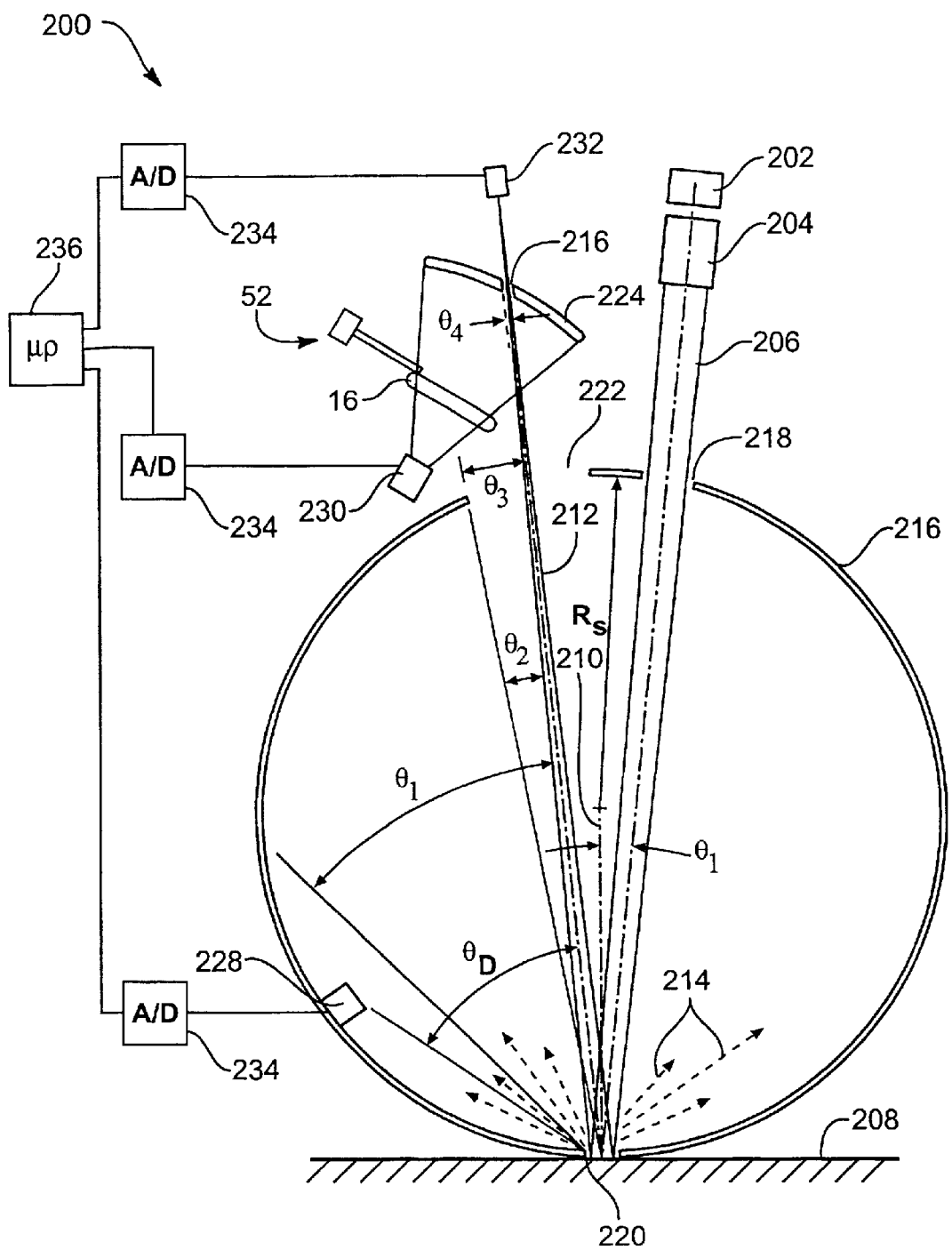
FIG. 6 is a schematic diagram of an alternative embodiment of an apparatus of the present invention.

Referring to FIG. 6, an alternative embodiment of a system 200 of the present invention is shown. The system 200 includes a light source 202 capable of producing a beam of light at a predetermined wavelength and a source optic 204. The beam 206 is directed toward the surface 208 at an incident angle $\theta$ with respect to the normal 210 of the surface 208. When the beam 206 hits the surface 208, a specular beam 212 and scattered light 214 are reflected off the surface 208.

The system 200 includes a first collector 216 which receives a first portion of the scattered light while permitting a second portion of scattered light to pass through. The first collector 216 may comprise a hollow sphere 216 having a radius ($R_s$). Such hollow spheres, generally referred to as "integrating spheres," are common in the art of optical measurement systems. The interior surface of the sphere 216 is a reflective material having a reflectance greater than about 90 percent. One integrating sphere 216, suitable for use by the present invention, is that sold by Labsphere, Inc. of New Hampshire, U.S.A., as model "SRM-99," in which the interior surface has a reflectance of about 99.1 percent. The integrating sphere 216 has the advantage of performing the function of the invention to perform roughness ratios of anisotropic roughness to isotropic roughness, but also provides spectral integrated functions of the surface 208.

The sphere 216 is configured with an input aperture 218, a sampling aperture 220, and an output aperture 222. The apertures are positioned within the sphere 216 and the sphere 216 is positioned relative to the light source 202 such that the beam of light 206 may be directed through the input aperture 218, through the sampling aperture 220, and onto the surface 208, and such that the second portion of the scattered light and the specular beam 212 are directed out of the sphere 216 through the output aperture 222.

The integrating sphere 216 is configured such that it captures the first portion of scattered light; that is, the scattered light extending from a first scatter angle $\theta_1$ to a second scatter angle $\theta_2$. The output aperture 222 is sized to permit the second portion of the scattered light, extending from a third scatter angle $\theta_3$ to a fourth scatter angle $\theta_4$, to exit the sphere 216. As illustrated in FIG. 3, the "scatter angle" is measured with respect to the specular beam 212.

The system 200 further includes a second collector 224 for receiving the second, or low band, portion of the scattered light as it exits the sphere 216 through the output aperture 222. In the embodiment shown, the second collector 224 is a focusing mirror with an output aperture 226 through which the specular beam 212 passes. The second collector 224 is sized and positioned with respect to the sphere 216 such that the collector 224 receives the scattered light extending from the third scatter angle $\theta_3$ to the fourth scatter angle $\theta_4$.

The system 200 includes a first detector 228 positioned to detect the intensity of the first, or high band, portion of the scattered light. The first detector 228 may be mounted in the wall of the sphere 216. Conventional integrating spheres typically employ a baffle to shield the detector 228 from light scattered off the surface 208 directly into the detector. Alternatively, the detector 228 may be positioned within the integrating sphere 216 such that the angle $\theta_0$ between the specular beam 206 and the line between the sampling aperture 220 and the first detector 228 is greater than $\theta_1$.

As in previous embodiments, the system 200 includes a shutter 16 that may be advanced into position relative to the second collector 224 such that it receives the second, or low band, portion of the scattered light. As previously discussed, the shutter 16 may be configured to block either the alpha or beta segment depending on whether radial or circumferential roughness is to be measured. A second detector 230 is positioned to detect light reflected from the second collector 224. A specular detector 232 is positioned to detect the intensity of the specular beam 212 after the beam passes through the second collector 224.

As in the embodiments of FIGS. 3 and 5, the detectors 228, 230, and 232 are in electrical communication with analog-to-digital converters 234. The signals received from the detectors 228, 230, and 232 are then processed by a microprocessor 236.

Figure 7A:
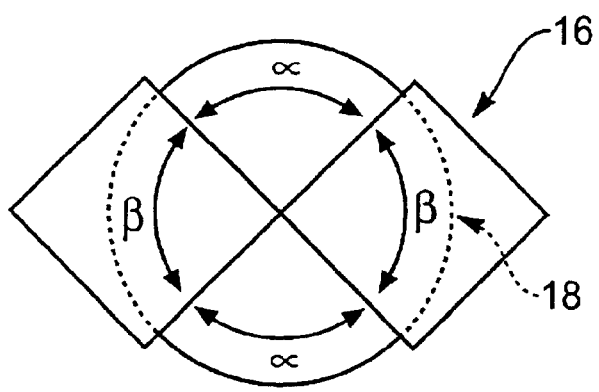
FIGS. 7A and 7B are plan views of shutter positions in an alternative implementation of the present invention.
Figure 7B:
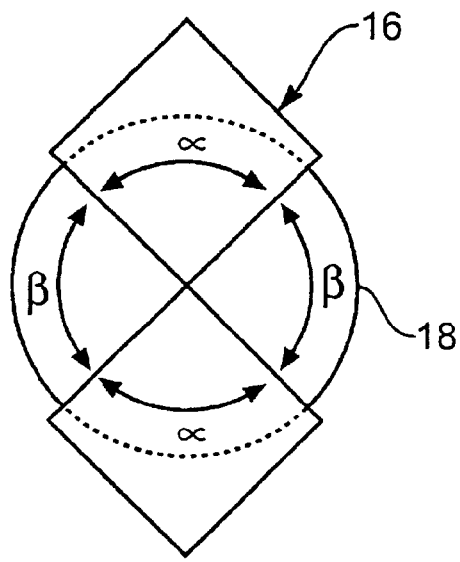

Referring to FIGS. 7A and 7B an alternative method for blocking light scatter and determining a roughness ratio is shown. The shutter 16 may be similarly configured with opaque optics for blocking passage of light. In FIG. 7A, the alpha segments pass by the shutter 16 to a detector, whereas the beta segments are blocked. The shutter 16 is aligned relative to a surface such that the alpha segments contain scatter from circumferential anisotropic structures. In this position, herein referred to as the "alpha position," the following equation defines the segmented scatter of the alpha segments, $P_{alpha}=\frac{1}{2}(P_{isotropic})+P_{anisotropic}$. The shutter 16 may be incorporated into a system such as that of FIG. 3, 5, or 6 and the alpha segments may be measured in a first measurement.

Referring to FIG. 7B, the shutter 16 is shown rotated approximately 90 degrees from the position of FIG. 7A. In this position, herein referred to as the "beta position," the optics substantially block the alpha segments and pass the beta segments. The following equation defines the segmented scatter of the beta segments, $P_{beta}=\frac{1}{2}(P_{isotropic})$. After taking both measurements, $P_{total}$ may be found as $P_{alpha}+P_{beta}$. L may then be found as $R/C=P_{alpha}/P_{beta}$.

In this alternative method, the shutter 16 is not removed from the light scatter, rather the shutter is rotated and two measurements are taken. The above referenced equations may then be applied. The advancing apparatus 52 is configured to rotate the shutter 16 between the alpha and beta positions. As one of skill in the art can appreciate, the order of measurements between the alpha and beta positions may be reversed.

Where radial anisotropic structures exist, the following equations are applicable:

$$P_{beta}=\tfrac{1}{2}(P_{isotropic})+P_{anisotropic};$$

$$P_{alpha}=\tfrac{1}{2}(P_{isotropic});$$

$$P_{total}=P_{alpha}+P_{beta}; \text{ and}$$

$$L=C/R=P_{beta}/P_{alpha}.$$

To measure radial anisotropic structures, the shutter 16 may be rotated between the alpha and beta positions as described above.

Figure 8:
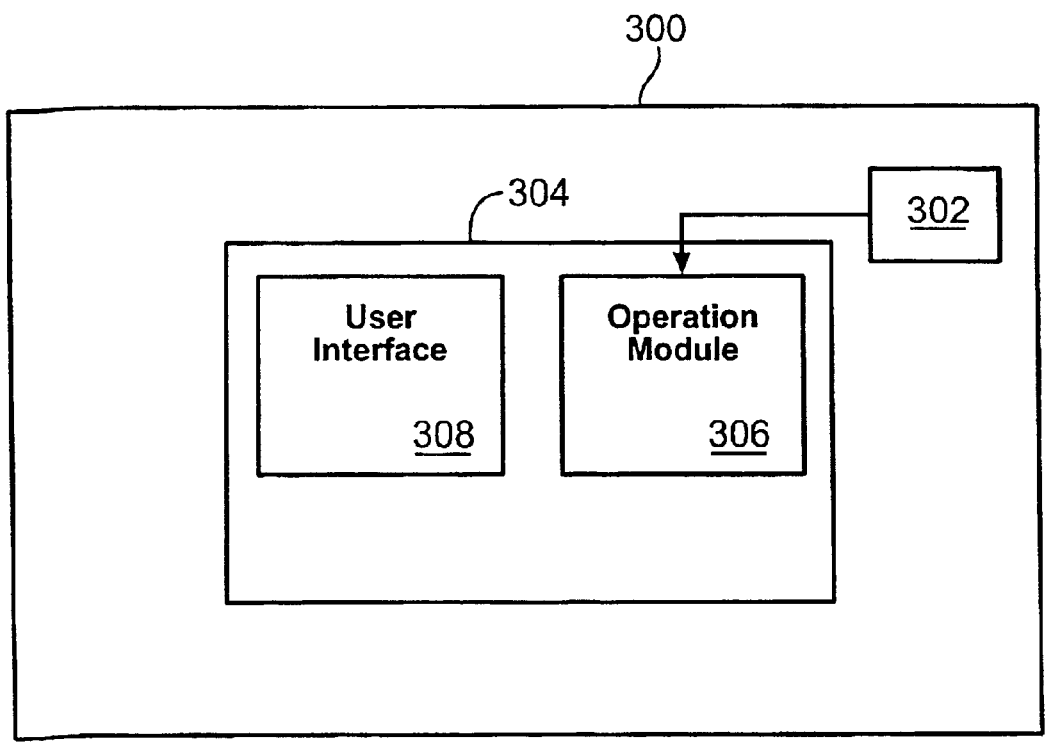
FIG. 8 is a block diagram of a computer that may be used in accordance with the present invention.

Referring to FIG. 8 a block diagram of a computer 300 is shown that may be in communication with measurement systems 30, 100, 200 of the present invention. The computer 300 includes a processor 302 that may be embodied as a microprocessor, microcontroller, or other digital processing device. The processor 302 may be the microprocessor 60, 136, 236 generally referred to in systems 30, 100, 200. The processor 302 is in electrical communication with a memory 304 which contains executable applications, generally referred to herein as "modules," and operational data. One of skill in the art will appreciate that the memory 304 may be embodied in various ways and may include a nonvolatile memory, a read only memory (ROM), and a random access memory (RAM).

The memory 304 includes an operational module 306 that performs calculations in accordance with methods of the present invention. For example, the operational module 306 calculates $P_{beta}$, $P_{alpha}$, $P_{isotropic}$, $P_{anisotropic}$, and $P_{total}$ based on received signals from detectors of a system. The operational module 306 calculates a roughness ratio based on the above described relationships. The memory 304 further includes a user interface module 308 that enables user input and output in accordance with the present invention.

Figure 9:
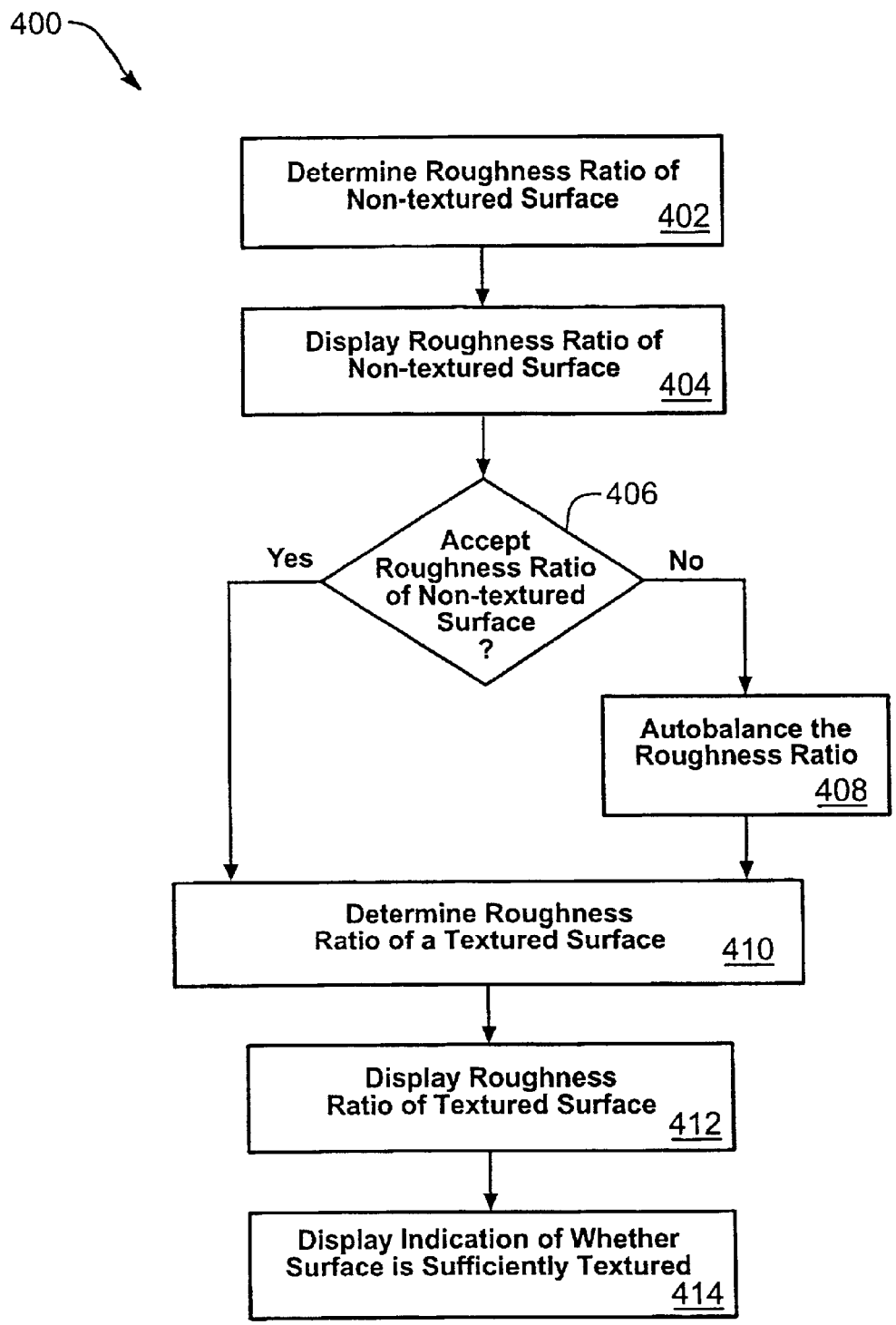
FIG. 9 is a flow diagram of a method for determining sufficient texturing on a surface in accordance with the present invention.

Referring to FIG. 9 there is shown a flow diagram 400 that illustrates a method for characterizing a surface of the present invention. The method may be performed by the processor 302 in conjunction with the operational and user interface modules 306, 308. The method may begin by determining 402 a roughness ratio of a non-textured surface. Several measurements may be taken at different locations on a surface. An aggregate may then be taken of the measurements to provide a radial and circumferential roughness.

A non-textured surface may not be entirely isotropic and may contain some anisotropic structures. For example, it is common practice to polish silicon wafers prior to texturing. The polish creates slight circumferential anisotropic structures. Light scatter systems are capable of measuring surface roughness on the order of angstroms. Thus, slight variances of surface roughness may be measured. One of skill in the art will appreciate that slight anisotropic structures may also occur radially for non-textured surfaces as well. Such structures may also be detected in accordance with the present invention.

With anisotropic surfaces present, a roughness ratio may be calculated that is not exactly one-to-one. With circumferential anisotropic structures, a radial-to-circumferential ratio may yield a greater than one value. Such a surface is not completely isotropic. However, a manufacturer may consider the surface to be non-textured and isotropic. Thus, according to a desired standard, a roughness ratio may be defined as being one-to-one.

The method may continue by displaying 404 a roughness ratio of the non-textured surface. A user may accept the given roughness ratio and that the surface has a slight texture. Alternatively, a user may alter the standard for a non-textured surface. In so doing, the given roughness ratio may be redefined as a one-to-one ratio. Defining the roughness ratio as being one-to-one is referred to herein as "autobalancing" the roughness ratio. Autobalancing the roughness ratio may be readily performed by the operational module 306. The method may query a user to accept 406 the roughness ratio or to autobalance 408 the roughness ratio. Autobalancing the roughness ratio effects subsequent measurements of a surface texture.

The method continues by determining 410 the roughness ratio of a textured surface. Texturing a surface is a manufacturing process that may be achieved in a variety of ways. A common industry practice is to contact a surface with a rotating pad to create circumferential scratches. The surface roughness is then measured in accordance with the present invention. Once again, surface roughness may be measured at several locations on a surface and averaged. This reduces the impact of foreign materials, surface impurities, scratches, and so forth. The roughness ratio of the textured surface is displayed 412 to a user.

An indication of whether the surface is considered to be textured or not may also be displayed 414 to a user. A predetermined threshold value may be used to determine if a surface is textured. The threshold value may be set according to manufacturing specifications and stored in the memory 304. Thus, a measured roughness ratio is compared against the threshold value. The computer 300 may then automatically determine whether a surface is sufficiently textured and display this to the user. As defined herein automatically signifies that no user intervention is required. In operation a user may measure numerous wafers or other surfaces. Automatically confirming the texturing of a surface expedites the measuring process.

Figure 10A:
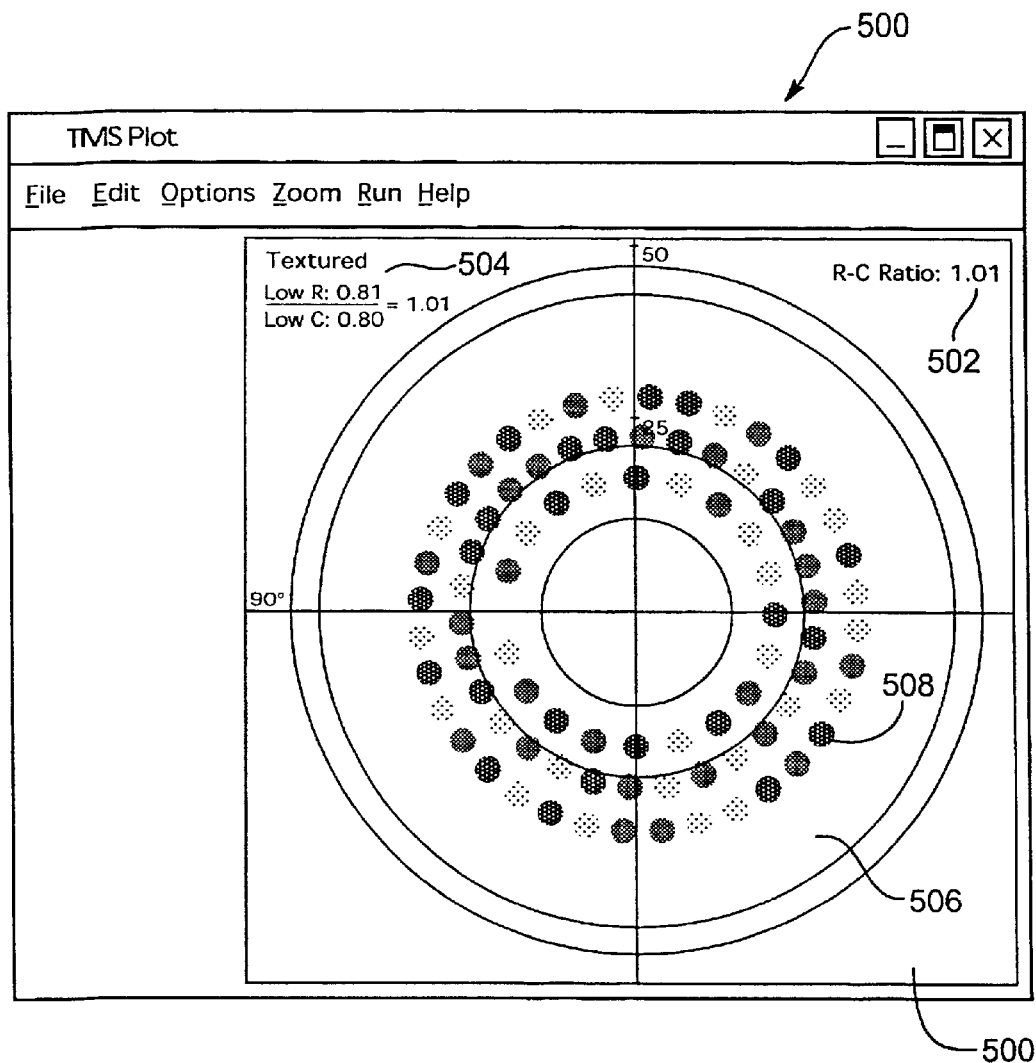
FIGS. 10A and 10B are exemplary graphical displays to a user in accordance with the present invention.

Referring to FIG. 10A, a sample display 500 is shown that may be generated by the user interface 308. The display 500 includes the measured roughness ratio 502. An indication 504 of whether or not the surface is textured may also be displayed. As shown, the roughness ratio is a radial-to-circumferential ratio, but in alternative implementations the roughness ratio may also be circumferential-to-radial. The given roughness ratio is 1.01 which indicates a surface which is substantially isotropic. The roughness ratio is an example of a ratio that may occur from some slight texturing such as polishing. If desired, the roughness ratio may be autobalanced and considered as a one-to-one ratio.

The display 500 may further include a plan view 506 of a surface. The display 500 may also include a number of graphical dots 508. The dots 508 provide a general indication of the number and location of surface measurements. During the measuring process, dots 508 may be displayed as measurements are taken in the corresponding locations. The dots 508 may also be colored or shaded to provide an indication of surface roughness at that location.

Figure 10B:
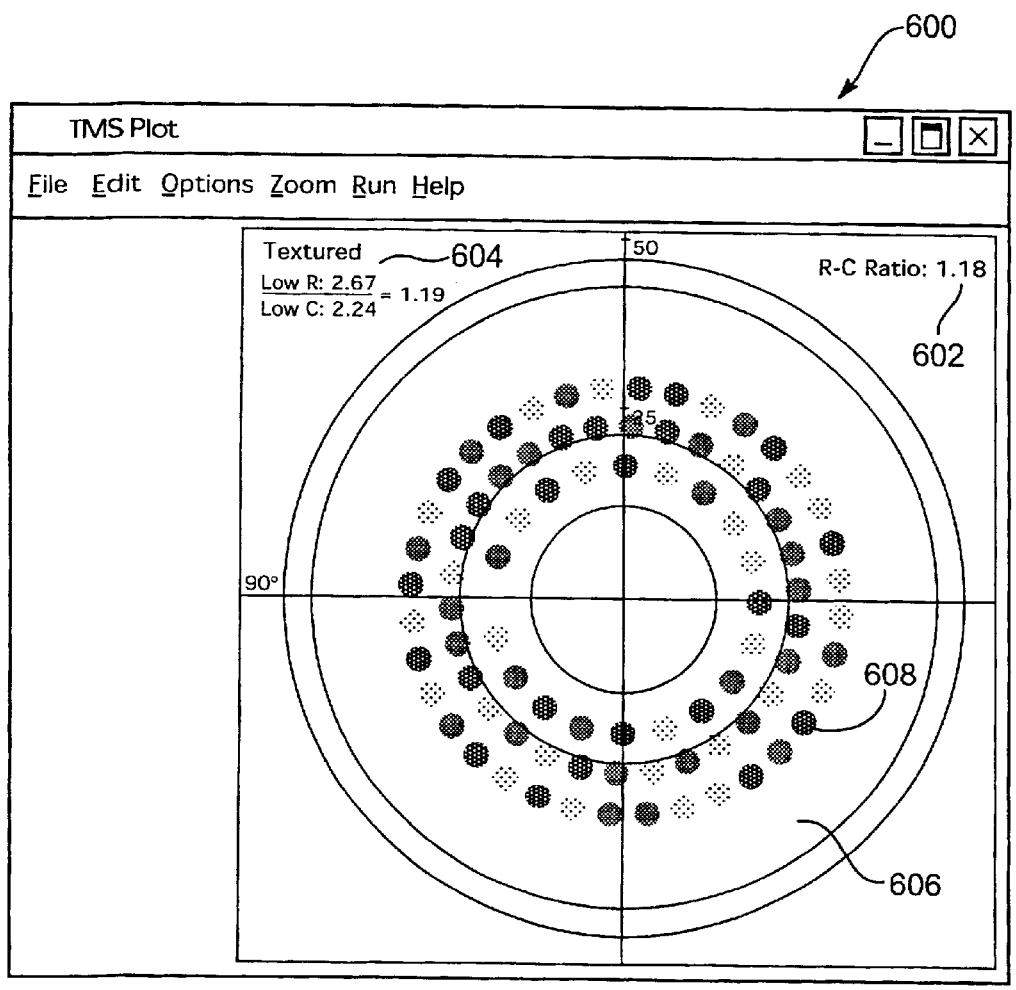

Referring to FIG. 10B, a sample display 600 is shown that may be generated for a textured surface. The display 600 provides the roughness ratio 602 and an indication 604 of whether or not the surface is considered textured. Comparing the roughness ratio to a threshold value and displaying the indication 604 may be performed automatically. As in FIG. 10A, the display 600 may include a plan view 606 and dots 608 to indicate measurements.

The system and method of the present invention provides for roughness comparisons between anisotropic roughness and isotropic or "background" roughness. Such comparisons may be made where the directionality of the anisotropic structure is either radial or circumferential. The present invention may utilize various optics for collecting light scatter and separating the light scatter to compute a roughness ratio. The roughness ratio may be displayed and a determination made as to whether or not a surface has sufficient texture.

It should be appreciated that the apparatus and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive of the scope of the invention. What is claimed is:

It will be obvious to those having skill in the art that many changes may be made to the details of the above-described embodiments of this invention without departing from the underlying principles thereof. The scope of the present invention should, therefore, be determined only by the following claims.

What is claimed is:

1. A system for characterizing a surface, comprising:

a light source for producing a beam of light;

a source optic for directing the beam of light toward the surface at an incident angle ($\theta_1$) with respect to the normal of the surface to thereby create a reflected specular beam and scattered light;

a collector disposed to collect the scattered light and to pass the specular beam;

a shutter, movable between an advanced position and a retracted position, wherein in the advanced position the shutter is disposed to receive the scattered light from the collector and pass a first segment of the scattered light and to block a second segment of the scattered light, wherein in the retracted position the shutter does not receive the scattered light; and a detector positioned to detect the intensity of the first segment when the shutter is in the advanced position and to detect the intensity of the scattered light when the shutter is in the retracted position.

2. The system for characterizing a surface of claim 1, wherein the shutter comprises a pair of rectangular, opaque optics.

3. The system for characterizing a surface of claim 1, wherein the shutter is disposed in the advanced position to block the second segment such that the second segment does not include substantially any anisotropic light scatter.

4. The system for characterizing a surface of claim 1, wherein the shutter is disposed in the advanced position such that the first and second segments have approximaately equivalent cross sectional areas.

5. The system for characterizing a surface of claim 1, wherein the collector comprises a focussing mirror.

6. The system for characterizing a surface of claim 1, wherein the collector comprises an integrated sphere.

7. The system for characterizing a surface of claim 1, further comprising a specular detector for receiving and measuring the specular beam.

8. The system for characterizing a surface of claim 1, further comprising an advancing apparatus coupled to the shutter, wherein the advancing apparatus moves the shutter between the advanced and retracted positions.

9. A system for characterizing a surface, comprising:

a light source for producing a beam of light;

a source optic for directing the beam of light toward the surface at an incident angle ($\theta_1$) with respect to the normal of the surface to thereby create a reflected specular beam and scattered light;

a first collector disposed to collect a first portion of scattered light and to pass a second portion of scattered light and the specular beam;

a first detector disposed to receive and measure the first portion of scattered light;

a second collector disposed to collect the second portion of scattered light and to pass the specular beam;

a shutter, movable between an advanced position and a retracted position, wherein in the advanced position the shutter is disposed to receive the second portion of scattered light from the second collector and pass a first segment of the second portion of scattered light and to block a second segment of the second portion of scattered light, wherein in the retracted position the shutter does not receive the second portion of scattered light; and a second detector positioned to detect the intensity of the first segment when the shutter is in the advanced position and to detect the intensity of the second portion of the scattered light when the shutter is in the retracted position.

10. The system for characterizing a surface of claim 9, wherein the shutter comprises a pair of rectangular, opaque optics.

11. The system for characterizing a surface of claim 9, wherein the shutter is disposed in the advanced position to block the second segment such that the second segment does not include substantially any anisotropic light scatter.

12. The system for characterizing a surface of claim 9, wherein the shutter is disposed in the advanced position such that the first and second segments have approximately equivalent cross sectional areas.

13. The system for characterizing a surface of claim 9, wherein the second collector comprises a focusing mirror.

14. The system for characterizing a surface of claim 9, wherein the first collector comprises a focusing mirror.

15. The system for characterizing a surface of claim 9, wherein the first collector comprises an integrated sphere.

16. The system for characterizing a surface of claim 15, wherein the integrated sphere is a hollow sphere having a radius ($R_s$) and includes, an input aperture;

a sampling aperture; and an output aperture, wherein the light source, source optic, and sphere are disposed for directing the beam of light through the input aperture, through the sampling aperture, and onto the surface and such that the second portion of the scattered light and the specular beam are directed out of the sphere through the output aperture.

17. The system for characterizing a surface of claim 9, further comprising a specular detector for receiving and measuring the specular beam.

18. The system for characterizing a surface of claim 9, further comprising an advancing apparatus coupled to the shutter, wherein the advancing apparatus moves the shutter between the advanced and retracted positions.

19. A method for characterizing a surface, comprising the steps of:

directing a beam of light onto the surface at a known incident angle with respect to the normal of the surface;

collecting light scatter off the surface;

measuring the intensity of the light scatter to produce a total intensity value;

blocking a first segment of the light scatter having substantially no anisotropic light scatter;

measuring the intensity of a second segment of the light scatter having substantially all of the anisotropic light scatter to produce an anisotropic intensity value; and determining a roughness ratio indicative of a comparison of the anisotropic roughness to the isotropic roughness of the surface.

20. The method for characterizing a surface of claim 19, wherein collecting light scatter includes the use of a focusing mirror.

21. The method for characterizing a surface of claim 19, wherein collecting light scatter includes the use of an integrated sphere.

22. The method for characterizing a surface of claim 19, wherein blocking a first segment of the light scatter further comprises:
configuring a shutter to block a segment having substantially no anisotropic light scatter; and
advancing the shutter to intersect the scattered light.

23. The method for characterizing a surface of claim 22, wherein the shutter comprises a pair of rectangular, opaque optics.

24. The method for characterizing a surface of claim 22, further comprising configuring the shutter such that first and second segments have approximately equivalent cross sectional areas.

25. The method for characterizing a surface of claim 19, wherein determining a roughness ratio further comprises subtracting the anisotropic intensity value from the total intensity value to produce an isotropic intensity value.

26. A system for characterizing a surface, comprising:
a light source for producing a beam of light;
a source optic for directing the beam of light toward the surface at an incident angle ($\theta_1$) with respect to the normal of the surface to thereby create a reflected specular beam and scattered light;
a collector disposed to collect the scattered light and to pass the specular beam;
a shutter, movable between first and second positions, wherein in the first position the shutter receives the scattered light from the collector and passes a first segment of the scattered light and blocks a second segment of the scattered light, wherein in the second position the shutter receives the scattered light from the collector and blocks the first segment and passes the second segment; and
a detector positioned to detect the intensity of the first segment when the shutter is in the first position and to detect the intensity of the second segment when the shutter is in the second position.

27. The system for characterizing a surface of claim 26, wherein the shutter comprises a pair of rectangular, opaque optics.

28. The system for characterizing a surface of claim 26, wherein the shutter is disposed in the first position to block the second segment such that the second segment does not include substantially any anisotropic light scatter.

29. The system for characterizing a surface of claim 26, wherein the shutter is disposed in the first and second positions such that the first and second segments have approximately equivalent cross sectional areas.

30. The system characterizing a surface of claim 26, wherein the collector comprises an integrated sphere.

31. The system characterizing a surface of claim 26, wherein the collector comprises an integrated sphere.

32. The system characterizing a surface of claim 26, further comprising a specular detector for receiving and measuring the specular beam.

33. The system for characterizing a surface of claim 26, further comprising an advancing apparatus coupled to the shutter, wherein the advancing apparatus moves the shutter between the first and second positions.

34. A system for characterizing a surface, comprising:
a light source for producing a beam of light;
a source optic for directing the beam of light toward the surface at an incident angle ($\theta_1$) with respect to the normal of the surface to thereby create a reflected specular beam and scattered light;
a first collector disposed to collect a first portion of scattered light and to pass a second portion of scattered light and the specular beam;
a first detector disposed to receive and measure the first portion of scattered light;
a second collector disposed to collect the second portion of scattered light and to pass the specular beam;
a shutter, movable between first and second positions, wherein in the first position the shutter receives the second portion of scattered light from the second collector and passes a first segment and blocks a second segment of the second portion, wherein in the second position the shutter receives the second portion of the scattered light from the second collector and blocks the first segment and passes the second segment; and
a second detector positioned to detect the intensity of the first segment when the shutter is in the first position and to detect the intensity of the second segment when the shutter is in the second position.

35. The system for characterizing a surface of claim 34, wherein the shutter comprises a pair of rectangular, opaque optics.

36. The system for characterizing a surface of claim 34, wherein the shutter is disposed in the first position to block the second segment such that the second segment does not include substantially any anisotropic light scatter.

37. The system for characterizing a surface of claim 34, wherein the shutter is disposed in the first and second positions such that the first and second segments have approximately equivalent cross sectional areas.

38. The system for characterizing a surface of claim 34, wherein the second collector comprises a focussing mirror.

39. The system for characterizing a surface of claim 34, wherein the first collector comprises a focussing mirror.

40. The system for characterizing a surface of claim 34, wherein the first collector comprises an integrated sphere.

41. The system for characterizing a surface of claim 40, wherein the integrated sphere is a hollow sphere having a radius ($R_s$) and includes,
an input aperture;
a sampling aperture; and
an output aperture,
wherein the light source, source optic, and sphere are disposed for directing the beam of light through the input aperture, through the sampling aperture, and onto the surface and such that the second portion of the scattered light and the specular beam are directed out of the sphere through the output aperture.

42. The system for characterizing a surface of claim 34, further comprising a specular detector for receiving and measuring the specular beam.

43. The system for characterizing a surface of claim 34, further comprising an advancing apparatus coupled to the shutter, wherein the advancing apparatus moves the shutter between the first and second positions.

44. A method for characterizing a surface, comprising the steps of:
directing a beam of light onto the surface at a known incident angle with respect to the normal of the surface;

collecting light scatter off the surface;

blocking a first segment of the light scatter having substantially no anisotropic light scatter;

measuring the intensity of a second segment of the light scatter having substantially all of the anisotropic light scatter;

blocking the second segment of the light scatter;

measuring the intensity of the first segment; and determining a roughness ratio indicative of a comparison of the anisotropic roughness to the isotropic roughness of the surface.

45. The method for characterizing a surface of claim 44, wherein collecting light scatter includes the use of a focusing mirror.

46. The method for characterizing a surface of claim 44, wherein collecting light scatter includes the use of an integrated sphere.

47. The method for characterizing a surface of claim 44, wherein blocking a first segment and a second segment includes the use of a shutter movable between first and second positions, wherein in the first position the shutter blocks the first segment and passes the second segment, and wherein in the second position the shutter blocks the second segment and passes the first segment.

48. The method for characterizing a surface of claim 47, wherein the shutter comprises a pair of rectangular, opaque optics.

49. The method for characterizing a surface of claim 47, further comprising configuring the shutter that first and second segments have approximately equivalent cross sectional areas.

50. A method for characterizing a surface to determine if a surface has sufficient texture, comprising:

directing a beam of light toward the surface at an incident angle ($\theta_1$) with respect to the normal of the surface to thereby create a reflected specular beam and scattered light;

collecting and measuring the intensity of the scattered light to determine surface roughness;

determining a roughness ratio indicative of a comparison of the anisotropic roughness to the isotropic roughness of the surface;

comparing the roughness ratio to a threshold value to determine if the surface is textured; and displaying to a user an indication whether the surface is textured.

51. The method for characterizing a surface of claim 50, further comprising:

determining a pre-texturing roughness ratio of the surface;

displaying to a user the pre-texturing roughness ratio; and in response to user input, adjusting the pre-texturing roughness ratio to a one-to-one ratio.

52. The method for characterizing a surface of claim 50, wherein collecting and measuring the intensity of the scattered light to determine surface roughness comprises:

measuring the intensity of the scattered light to produce a total intensity value;

blocking a first segment of the scattered light having substantially no anisotropic light scatter; and measuring the intensity of a second segment of the scattered light having substantially all of the anisotropic light scatter to produce an anisotropic intensity value.

53. The method for characterizing a surface of claim 52, wherein blocking a first segment of the light scatter further comprises:

configuring a shutter to block a segment having substantially no anisotropic light scatter; and advancing the shutter to intersect the scattered light.

54. The method for characterizing a surface of claim 53, wherein the shutter comprises a pair of rectangular, opaque optics.

55. The method for characterizing a surface of claim 50, wherein collecting and measuring the intensity of the scattered light to determine surface roughness comprises:

blocking a first segment of the light scatter having substantially no anisotropic light scatter;

measuring the intensity of a second segment of the light scatter having substantially all of the anisotropic light scatter;

blocking the second segment of the light scatter; and measuring the intensity of the first segment.

56. The method for characterizing a surface of claim 55, wherein blocking a first segment and a second segment includes the use of a shutter movable between first and second positions, wherein in the first position the shutter blocks the first segment and passes the second segment, and wherein in the second position the shutter blocks the second segment and passes the first segment.

57. The method for characterizing a surface of claim 56, wherein the shutter comprises a pair of rectangular, opaque optics.

58. A computer readable medium having stored thereon computer executable instructions for performing a method for characterizing a surface to determine if a surface has sufficient texture, the method comprising:

receiving signals representative of the intensity of scattered light reflected from the surface;

determining a roughness ratio indicative of a comparison of the anisotropic roughness to the isotropic roughness of the surface;

comparing the roughness ratio to a threshold value to determine if the surface is textured; and displaying to a user an indication whether the surface is textured.

59. The computer readable medium of claim 58, wherein the method further comprises:

determining a pre-texturing roughness ratio of the surface;

displaying to a user the pre-texturing roughness ratio; and in response to user input, adjusting the pre-texturing roughness ratio to a one-to-one ratio.

* * * * *

UNITED STATES PATENT AND TRADEMARK OFFICE
CERTIFICATE OF CORRECTION

PATENT NO. : 6,700,657 B1
DATED : March 2, 2004
INVENTOR(S) : Mark E. Southwood

It is certified that error appears in the above-identified patent and that said Letters Patent is hereby corrected as shown below:

<u>Title page,</u>
Item [57], ABSTRACT,
Line 1, reads, "A method for characterizing ... " which should read -- A system and method for characterizing ... --
Line 3 reads, "... Scattered light and a spectacular beam ... " which should read -- ... Scattered light and a specular beam ... --

<u>Column 3,</u>
Line 30, reads, "... The method discloses if first and ..." which should read -- ... The method discloses first and ... --

<u>Column 7,</u>
Line 9, reads, "... incident angle a with respect to the ... " which should read -- ... incident angle $\theta_i$ with respect to the ... --

<u>Column 10,</u>
Line 11, reads, "... such that the angle $\theta_o$ between the ..." which should read -- ... such that the angle $\theta_D$ between the ... --

<u>Column 13,</u>
Line 41, reads, "... segments have approximaately ..." which should read --... segments have approximately ... --
Line 44, reads, "... comprises a focussing mirror." which should read "... comprises a focusing mirror. --

<u>Column 15,</u>
Line 58, reads, "... collector comprises an integrated sphere." which should read -- ... collector comprises a focusing mirror. --
Line 39, reads, "... comprises a focussing mirror." which should read -- ... comprises a focusing mirror. --

UNITED STATES PATENT AND TRADEMARK OFFICE
CERTIFICATE OF CORRECTION

PATENT NO. : 6,700,657 B1
DATED : March 2, 2004
INVENTOR(S) : Mark E. Southwood

It is certified that error appears in the above-identified patent and that said Letters Patent is hereby corrected as shown below:

Column 17,
Line 30 reads, "... configuring the shutter that first ..." which should read
-- ... configuring the shutter such that first ... --

Signed and Sealed this

Twenty-third Day of November, 2004

JON W. DUDAS
*Director of the United States Patent and Trademark Office*